(12) United States Patent
Grichar et al.

(10) Patent No.: US 7,581,647 B2
(45) Date of Patent: Sep. 1, 2009

(54) SHALE SHAKER

(75) Inventors: Charles Newton Grichar, Houston, TX (US); Kenneth Wayne Seyffert, Houston, TX (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 515 days.

(21) Appl. No.: 10/512,372

(22) PCT Filed: Mar. 13, 2003

(86) PCT No.: PCT/IB03/01031

§ 371 (c)(1),
(2), (4) Date: Oct. 25, 2004

(87) PCT Pub. No.: WO03/090940

PCT Pub. Date: Nov. 6, 2003

(65) Prior Publication Data

US 2006/0016768 A1      Jan. 26, 2006

(51) Int. Cl.
*F24B 15/00* (2006.01)
*B07B 1/49* (2006.01)

(52) U.S. Cl. ....................... 209/370; 209/412

(58) Field of Classification Search ............... 209/370, 209/404, 405, 408, 409, 412, 413
See application file for complete search history.

(56) References Cited

U.S. PATENT DOCUMENTS

| | | | | |
|---|---|---|---|---|
| 3,893,488 A | 7/1975 | Rogers et al. | ............ | 138/141 |
| 3,893,525 A | 7/1975 | Dower et al. | ............ | 175/24 |
| 3,928,189 A | 12/1975 | Lower et al. | ............ | 209/405 |
| 4,420,391 A * | 12/1983 | Sharki | ............ | 209/403 |
| 4,728,422 A | 3/1988 | Bailey | ............ | 210/314 |
| 4,735,712 A | 4/1988 | Herren et al. | ............ | 209/403 |
| 4,818,998 A * | 4/1989 | Apsell et al. | ............ | 342/444 |
| 5,006,228 A | 4/1991 | Anderson et al. | ............ | 209/365.3 |
| 5,385,669 A | 1/1995 | Leone | ............ | 210/488 |
| 5,536,264 A | 7/1996 | Hsueh et al. | ............ | 604/368 |
| 5,551,575 A | 9/1996 | Leone | ............ | 209/273 |

(Continued)

FOREIGN PATENT DOCUMENTS

EP      0 169 698      1/1986

(Continued)

OTHER PUBLICATIONS

Putting it together—the science and technology of composite materials, http://www.science.org.au/nova/059/059print.htm, Australian Academy of Science, posted Nov. 2000.*

(Continued)

*Primary Examiner*—Patrick H Mackey
*Assistant Examiner*—Mark Hageman
(74) *Attorney, Agent, or Firm*—Guy McClung

(57) ABSTRACT

A shale shaker (10) or vibratory separator which, in one aspect, has a base (22), vibration isolation apparatus on the base (22), a basket (12), mount apparatus (16) for mounting the basket on the base (22), and at least one of the base (22), basket (12), and the mount apparatus (16) made of, encased in, or coated with composite material which, in certain aspects, is all or part flexible composite material; and methods of using such separators and shakers.

25 Claims, 8 Drawing Sheets

U.S. PATENT DOCUMENTS

| | | | |
|---|---|---|---|
| 5,566,919 A | 10/1996 | Shephard | 248/604 |
| 5,580,626 A * | 12/1996 | Quigley et al. | 428/36.2 |
| 5,685,982 A | 11/1997 | Foster | 210/385 |
| 5,851,686 A | 12/1998 | Aghajanian et al. | 428/614 |
| 5,855,955 A | 1/1999 | Claar et al. | 427/248.1 |
| 5,917,423 A * | 6/1999 | Duvall | 340/825.37 |
| 5,924,261 A | 7/1999 | Fricke | 52/720.1 |
| 5,938,936 A | 8/1999 | Hodges et al. | 210/705 |
| 5,996,521 A * | 12/1999 | Kitano et al. | 114/90 |
| 6,019,228 A | 2/2000 | Duggan | 209/408 |
| 6,129,962 A * | 10/2000 | Quigley et al. | 428/36.1 |
| 6,152,307 A | 11/2000 | Adams et al. | 209/403 |
| 6,155,428 A | 12/2000 | Bailey et al. | 209/315 |
| 6,186,337 B1 | 2/2001 | Adams et al. | 209/401 |
| 6,194,481 B1 | 2/2001 | Furman et al. | 522/77 |
| 6,267,247 B1 | 7/2001 | Seyffert et al. | 209/403 |
| 6,269,953 B1 | 8/2001 | Seyffert et al. | 209/399 |
| 6,290,068 B1 | 9/2001 | Adams et al. | 209/401 |
| 6,302,276 B1 | 10/2001 | Seyffert et al. | 209/412 |
| 6,324,833 B1 | 12/2001 | Singer et al. | 60/271 |
| 6,325,216 B1 | 12/2001 | Seyffert et al. | 209/408 |
| 6,331,028 B1 | 12/2001 | O'Neill et al. | 296/100 |
| 6,339,047 B1 | 1/2002 | Christopherson et al. | 505/410 |
| 6,346,319 B1 * | 2/2002 | Cochran | 428/295.1 |
| 6,346,325 B1 | 2/2002 | Edwards et al. | 428/401 |
| 6,352,779 B1 * | 3/2002 | Edwards et al. | 428/412 |
| 6,353,038 B1 | 3/2002 | Aho et al. | 523/105 |
| 6,355,206 B1 | 3/2002 | Hanzawa et al. | 266/239 |
| 6,355,358 B1 | 3/2002 | Boer et al. | 428/474.4 |
| 6,358,603 B1 | 3/2002 | Bache | 428/323 |
| 6,361,860 B1 | 3/2002 | Koch | 428/364 |
| 6,371,302 B1 | 4/2002 | Adams et al. | 209/412 |
| 6,413,478 B1 | 7/2002 | Mabry et al. | 422/187 |
| 6,722,504 B2 | 4/2004 | Schulte et al. | 209/359 |
| 6,786,233 B1 * | 9/2004 | Anderson et al. | 137/615 |

FOREIGN PATENT DOCUMENTS

| | | |
|---|---|---|
| EP | 0 238 455 | 9/1987 |
| GB | 2 085 744 A | 5/1982 |
| GB | 2 089 403 A | 6/1982 |

OTHER PUBLICATIONS

Composites, Chou, Tsu-Wei et al. Scientific American, Oct. 1986, vol. 255 No. 4 pp. 193-203.*
Roblon, Roblon Als. 2001.
TK Liner System, Tuboscope, Feb. 2001.
TK 21 Liner System, Tuboscope, Feb. 2001.
TK 33 Liner System, Tuboscope, Feb. 2001.
TK 34 Liner System, Tuboscope, Feb. 2001.
TK 34 XT Liner System, Tuboscope, Feb. 2001.
TK 69 Liner System, Tuboscope, Feb. 2001.
TK 70 Liner System, Tuboscope, Feb. 2001.
TK 99 Liner System, Tuboscope, Feb. 2001.
Our coating services enhance you tubulars' performance and your bottom line, Tuboscope, 2001.

* cited by examiner

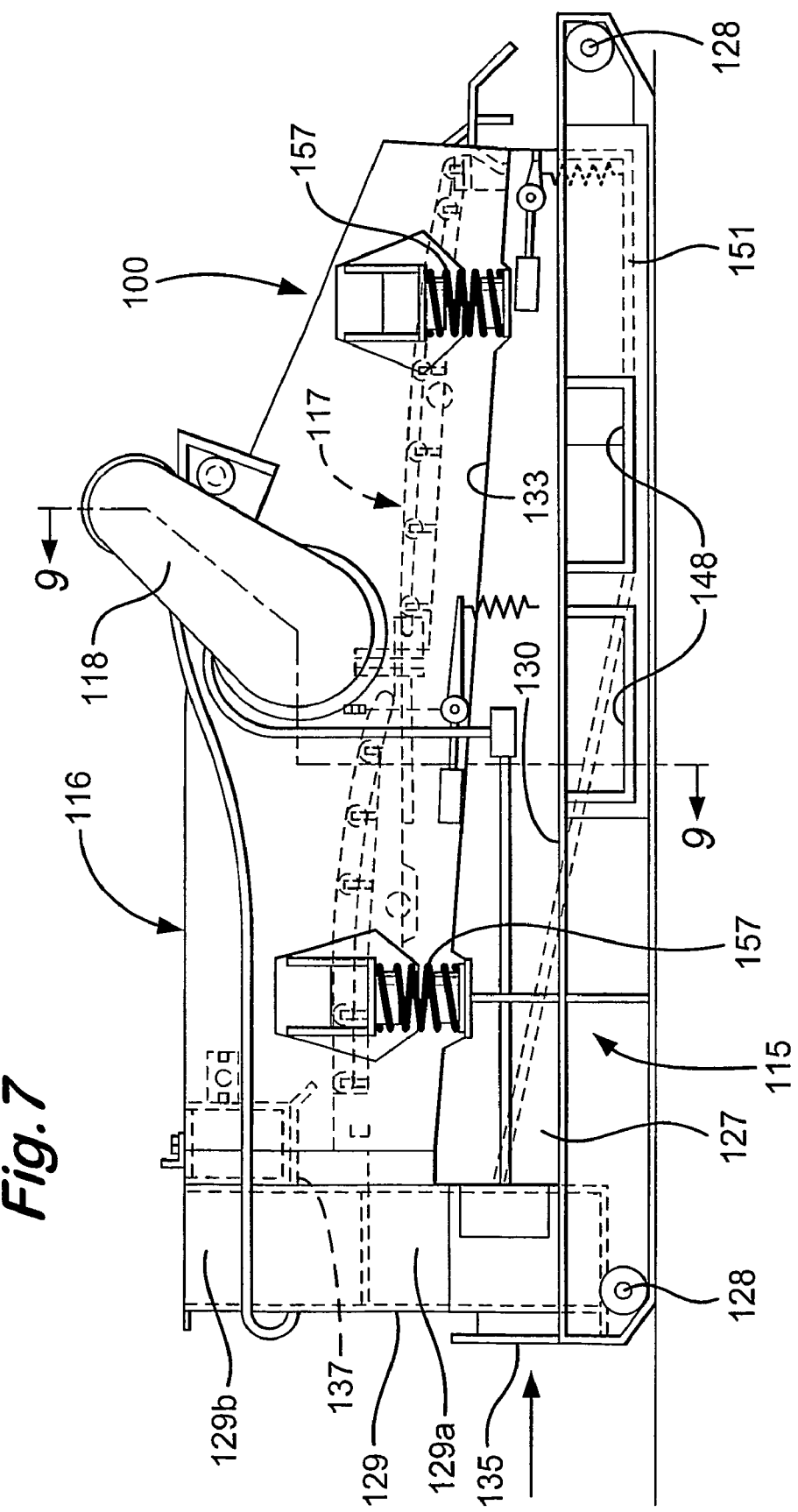

SHALE SHAKER

This invention relates to vibratory separators and, particularly, but not exclusively, to shale shakers.

In the drilling of a borehole in the construction of an oil or gas well, a drill bit is arranged on the end of a drill string and is rotated to bore the borehole. A drilling fluid known as "drilling mud" is pumped through the drill string to the drill bit to lubricate the drill bit. The drilling mud is also used to carry the cuttings produced by the drill bit and other solids to the surface through an annulus formed between the drill string and the borehole. The drilling mud contains expensive synthetic oil-based lubricants and it is normal therefore to recover and reuse the used drilling mud, but this requires the solids to be removed from the drilling mud. This is achieved by processing the drilling fluid. The first part of the process is to separate the solids from the solids laden drilling mud. This is at least partly achieved with a vibratory separator, such as those shale shaker disclosed in U.S. Pat. No. 5,265,730, WO 96/33792 and WO 98/16328.

Shale shakers generally comprise an open bottomed basket having one open discharge end and a solid walled feed end. A number of rectangular screens are arranged in the basket, which are typically held in C-channel rails located on the basket walls, such as those disclosed in GB-A-2,176,424 or using hook-strip connection means. The basket is arranged on springs above a receptor for receiving recovered drilling mud. A skip or ditch is provided beneath the open discharge end of the basket. A motor is fixed to the basket, which has a drive rotor provided with an offset clump weight. In use, the motor rotates the rotor and the offset clump weight, which causes the basket and the screens fixed thereto to shake. Solids laden mud is introduced at the feed end of the basket on to the screens. The shaking motion induces the solids to move along the screens towards the open discharge end. Drilling mud passes through the screens. The recovered drilling mud is received in the receptor for further processing and the solids pass over the discharge end of the basket into the ditch or skip.

The screens are generally of one of two types: hook-strip; and pre-tensioned.

The hook-strip type of screen comprises several rectangular layers of mesh in a sandwich, usually comprising one or two layers of fine grade mesh and a supporting mesh having larger mesh holes and heavier gauge wire. The layers of mesh are joined at each side edge by a strip which is in the form of au elongate hook. In use, the elongate hook is hooked on to a tensioning device arranged along each side of a shale shaker. The shale shaker further comprises a crowned set of supporting members, which run along the length of the basket of the shaker, over which the layers of mesh are tensioned. An example of this type of screen is disclosed in GB-A-1,526,663. The supporting mesh may be provided with or replaced by a panel having apertures therein.

The pre-tensioned type of screen comprises several rectangular layers of mesh, usually comprising one or two layers of fine grade mesh and a supporting mesh having larger mesh holes and heavier gauge wire. The layers of mesh are pre-tensioned on a rigid support comprising a rectangular angle iron frame and adhered thereto. The screen is then inserted into C-channel rails arranged in a basket of a shale shaker. An example of this type or screen is disclosed in GB-A-1,578,948.

Many typical vibratory separators and shale shakers have a basket to which is secured one or more screens used for separating components of material fed to the vibratory separator or shale shaker. Vibrating apparatus connected to the basket vibrates the basket and the vibrations are imparted to the screen or screens secured therein.

U.S. Pat. No. 6,155,428 discloses a vibratory screening machine having a basket mounted on springs on a base. It is suggested that the springs may be replaced with rubber or plastics or rubber and plastics composit material.

U.S. Pat. No. 3,929,189 discloses a screening machine having a rigid inelastic composite friction material secured at the interface between the screen assembly and the vibratory frame for reducing wear from rubbing therebetween.

U.S. Pat. No. 6,371,302 discloses a screen assembly and a shale shaker and support strips. The support strips made of composite material.

Typically it is desirable to maximize vibration of the screen (s) while isolating equipment, objects, and structures adjacent the vibratory separator from the intense vibrations produced by the vibrating apparatus. Such isolation is effected by using springs, rubber or rubber-like or resilient members or cushions, isolator apparatus, and shock absorbers on which the container or basket is mounted.

In many vibratory separators and shale shakers parts of the machine are made of steel, for example the container basket, housings for vibrating apparatus, vibration isolating springs, and spring mounts. In many environments in which vibratory separators and shale shakers are used, these steel parts are subjected to harsh conditions that result in wear, erosion, rust, and corrosion of the steel. Often shale shakers are used offshore on rigs over salt water. Both the salt environment and the chemicals in drilling fluids processed by the shale shakers can contribute to the deterioration of steel parts.

In the past parts of screen assemblies and decks for such screens have been made of composite materials; but no prior art suggest that parts of a shale shaker such as the basket, base, or spring mounts be made of composite material, nor does any prior art provide the motivation to do so.

The present inventors have recognised that, for a vibratory separator and shale shaker with a basket, base, and/or spring mount need to resist wear, rust and corrosion. The inventors have recognised that such machines internal vibration can be maximized while effectively isolating objects adjacent the machines from the vibrations. There has long been a need for such machines which are more cost-effective; relatively lighter in weight and easy to transport either assembled or unassembled; able to withstand material fatigue due to vibration; and/or which are easily repaired.

According to the invention, there is provided a shale shaker comprising a base, vibration isolation apparatus on said bases, a basket mount apparatus for mounting said basket on said base and a vibratory mechanism for vibrating said basket, characterised in that said basket is made of or encased in a composite material.

Preferably, the composite is non-metal composite material. Advantageously, the composite material include at least a portion thereof made of flexible composite material. Preferably, the composite material includes at least one reinforcing part within the composite material. Advantageously, the reinforcing part is made of metal. Preferably, the reinforcing part is made of material from the group consisting of wood, plastic, fibre, and composite material.

Advantageously, the shale shaker further comprises electronic tacking apparatus.

Preferably, the basket has a plurality of interconnected walls, advantageously, the walls connected by electromagnetic welding.

Advantageously, the shale shaker has a screen support apparatus and vibratory apparatus for vibrating the screen support apparatus, and isolation apparatus for isolating the screen support apparatus to inhibit vibrations vibrating the screen apparatus from vibrating objects other than the screen support apparatus and the screen apparatus. Preferably, the shale shaker further comprises mounting apparatus to which is mounted the isolation apparatus, the mounting apparatus made from composite material. Advantageously, the mounting apparatus includes at least a portion made from flexible composite material. Preferably, the at least a portion made from flexible composite material is a plurality of spaced-apart amounts of flexible composite material. Advantageously, the mounting apparatus is made from flexible composite material. Preferably, the isolation apparatus is a plurality of spaced-apart isolation apparatuses. Advantageously, the isolation apparatus is from the group consisting of springs, resilient members, cushions, flexible hollow members, and inflatable members. Preferably, the isolation apparatus is coated with composite material. Preferably, the isolation apparatus is encased in composite material. Advantageously, the shale shaker further comprises mounting apparatus to which is mounted the isolation apparatus, the mounting apparatus coated with composite material. Advantageously, the shale shaker further comprises mounting apparatus to which is mounted the isolation apparatus, the mounting apparatus encased in composite material.

Preferably, the shale shaker is for treating fluid introduced thereto, the fluid to be treated comprising fluid with drilled cuttings therein. Advantageously, the shale shaker is for treating fluid introduced thereto, the fluid to be treated including lost circulation material. Preferably, the lost circulation material includes fibrous lost circulation material.

Advantageously, the shale shaker has at least one of said base and said mount apparatus also made of or encased in or coated with a composite material The present invention also provides a method for separating solids from a solids laden drilling fluid using a shale shaker, the method comprising introducing fluid to be treated to the shale shaker, the shale shaker having a base, vibration isolation apparatus on said base, a basket, mount apparatus for mounting said basket on said base, and a vibratory mechanism for vibrating said basket wherein said basket is made of or encased in a composite material, and processing said fluid through the shale shaker.

Preferably, the drilling fluid comprises drilled cuttings. Advantageously, the drilling fluid includes lost circulation material. Preferably, the composite material includes at least a portion thereof that is flexible composite material. Advantageously, at least one of the base and the mount apparatus is also made of, or encased in a composite material In certain aspects, the present invention discloses shale shakers with some parts and components made of composites which are shipped and transported to a job site and assembled at the site. In certain particular aspects, parts are adhesively bonded together or welded together. In one particular aspect parts made of particular types of composite are electromagnetically welded together either at a manufacturing facility or at a job site, for example, at a drilling rig.

In certain embodiments, the present invention discloses shale shakers in which composite (in one aspect relatively flexible composite) material is used in spring mounts to enhance the vibration isolation accomplished by the spring mounts. Walls and/or sides of a basket of a shaker can in accordance with the present invention, be made of composite material or can have areas made of such composite material (which in one aspect is tentatively flexible composite) as can spring mounting brackets or parts.

Shale shakers in accordance with the present invention, useful for treating drilling fluid with drilled cuttings and/or with lost circulation material therein, which, in one aspect, includes fibrous lost circulation material and which may be, but is not limited to, any lost circulation material disclosed in or referred to in pending U.S. application Ser. No. 09/975,075 filed Oct. 11, 2001 and co-owned with the present invention and incorporated fully herein for all purposes.

Such machines in which the screen(s) used for separating material components are effectively vibrated while objects adjacent the machines are not detrimentally vibrated or such vibration is reduced by employing isolator apparatus parts, components and structural members made of composite material and, in one particular aspect, such parts, etc. made of relatively flexible composite material.

Such machines that are transportable unassembled and are easily assembled at a job site;

Such machines with such parts that are easily repaired;

Such machines useful for treating drilling fluid with drilled cuttings and/or with lost circulation material therein, which, in one aspect, includes fibrous lost circulation material.

For a better understanding of the present invention, reference will now be made, by way of example, to the accompanying drawings, in which:

FIG. 7 is a side view or a vibratory separator in accordance with the present invention;

Figure 1:
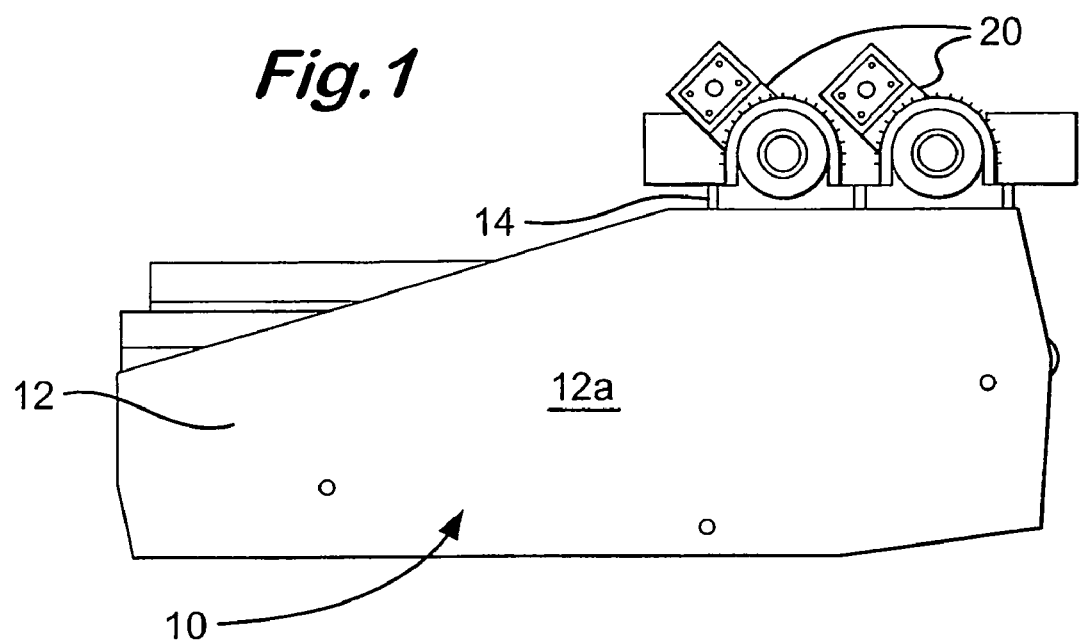
FIG. 1 is a side view of a shale shaker in accordance with the present invention.
Figure 2:
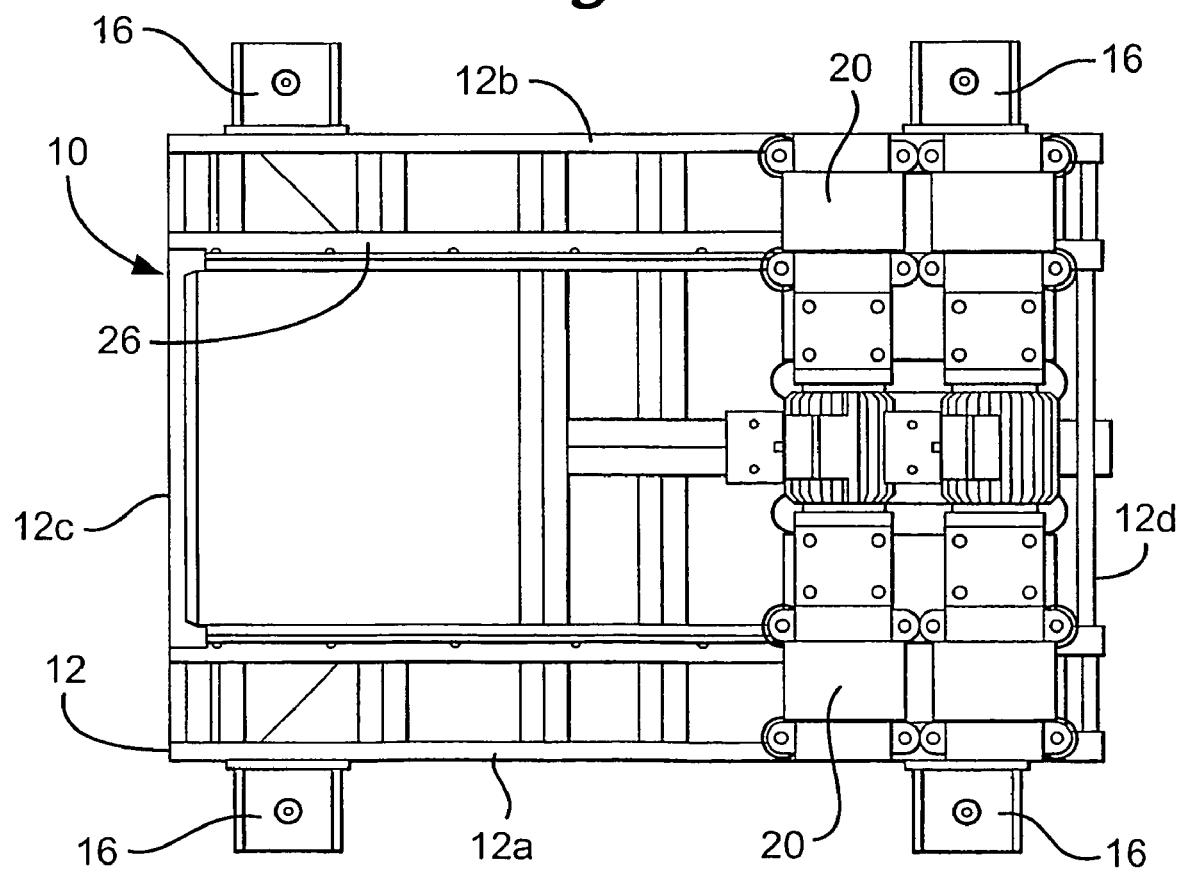
FIG. 2 is a top view of the shale shaker of FIG. 1.
Figure 3:
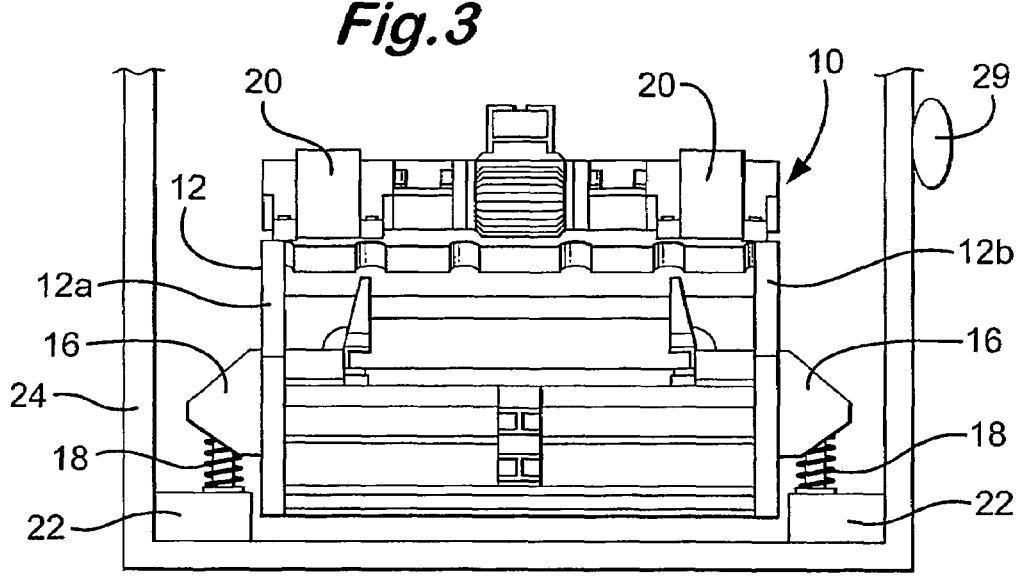
FIG. 3 is an end view of the shale shaker of FIG. 1.

FIGS. 1 to 3 show a shale shaker 10 in accordance with the present invention which has a screen-mounting basket 12 and a bridge 14 on which are mounted two vibrating apparatuses 20. The basket 12 has bracket 16 to which are secured helical springs 18. Each spring 18 is secured to a base member 22. As shown in FIG. 3, an optional housing 24 may be used on sides of and beneath the shale shaker 10. Optionally (and as may be the case with any shale shaker disclosed herein in accordance with the prevent invention or with any known prior art shaker or vibratory separator) an electronic tracking apparatus 29 is on the housing 24, but may, in accordance with the present invention, be within any suitable member or part of a shale shaker; and, optionally, such a tacking apparatus has a container or housing made of composite material and/or is encased within or coated with composite material. Any known tracking device, apparatus, or system may be used, including, but not limited to known satellite tracking systems.

The brackets 16 are made, preferably, of composite material, as are the base members 22 and the housing 24. Optionally, the basket 12 (side walls 12a, 12b; ends 12c, 12d) is made of composite material. Alternatively one, some, or all of these components are made of steel encased in composite or steel coated with composite. A coating of composite may have the thickness of a layer of paint or of two, three, four or more layer of paint. A shale shaker similar to the shale shaker 10, but with no teaching, motivation, or suggestion of using such composite material for a shale shaker or parts of it, is disclosed in U.S. Pat. No. 6,155,428 incorporated fully herein for all purposes.

Figure 4:
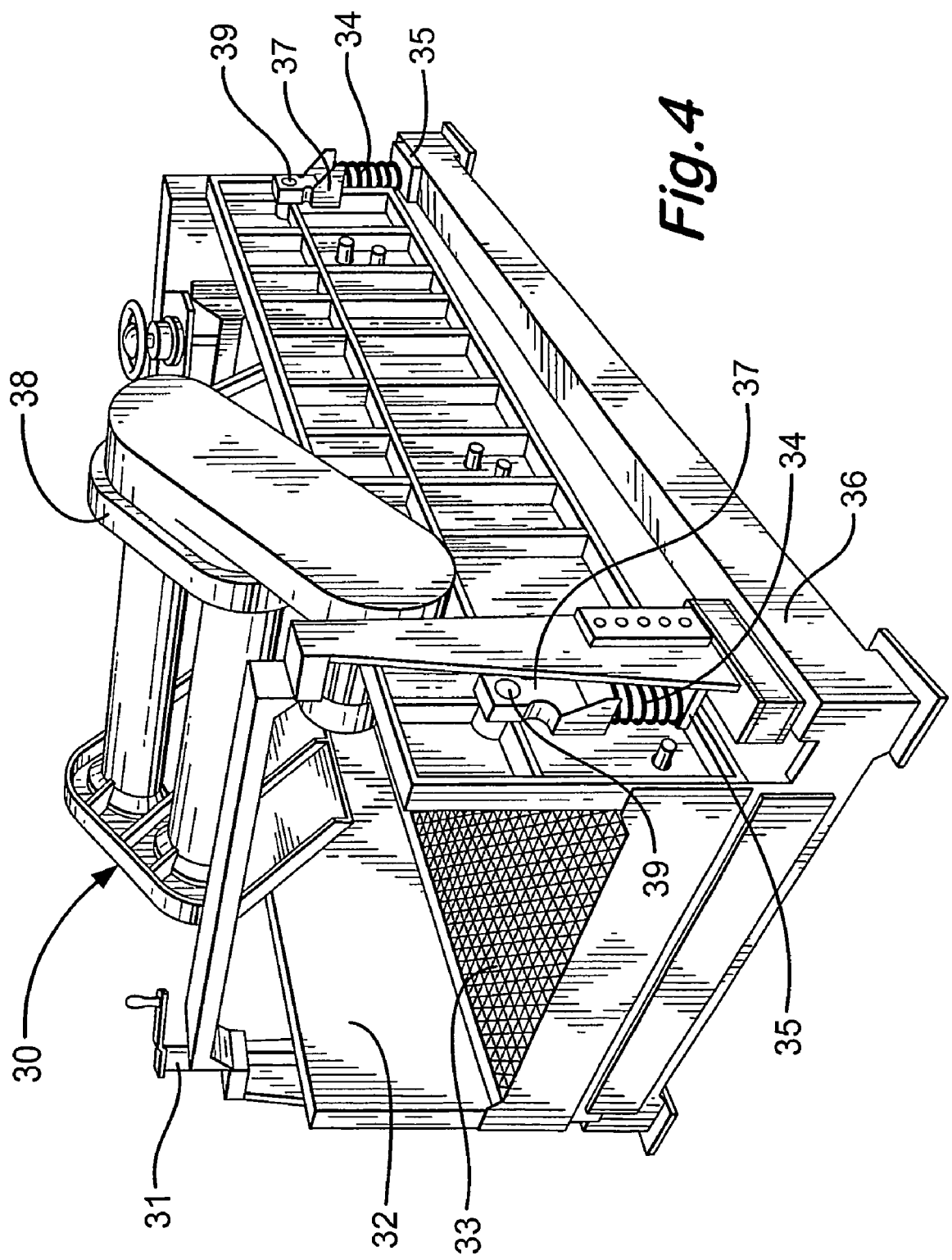
FIG. 4 is a perspective view of a shale shaker in accordance with the present invention.

FIG. 4 shows a shale shaker 30 in accordance with the present invention, which has screen apparatus 33 mounted in a basket 32. Between basket mount members 37 and mount members 35 on a frame 36 are mounted springs 34 for isolating vibration of the shale shaker 30. Vibrating apparatus 38 vibrates the basket 32 to vibrate the screen apparatus 33. Elevator apparatus 31 provides for raising and lowering of the basket end. Posts 39 secured to the basket 32 extend through corresponding holes in the mount members 37.

In accordance with the present invention, the basket 32 is, preferably, made of composite material as are the mount members 37, frame 36 mount members 35, and posts 39. A shale shaker similar to the shale shaker 40 is disclosed in U.S. Pat. No. 5,392,925 (co-owned with the present invention and incorporated fully herein for all purposes), but this patent has no teaching, motivation, or suggestion to make a shale shaker or parts of it with such composite material.

Figure 5:
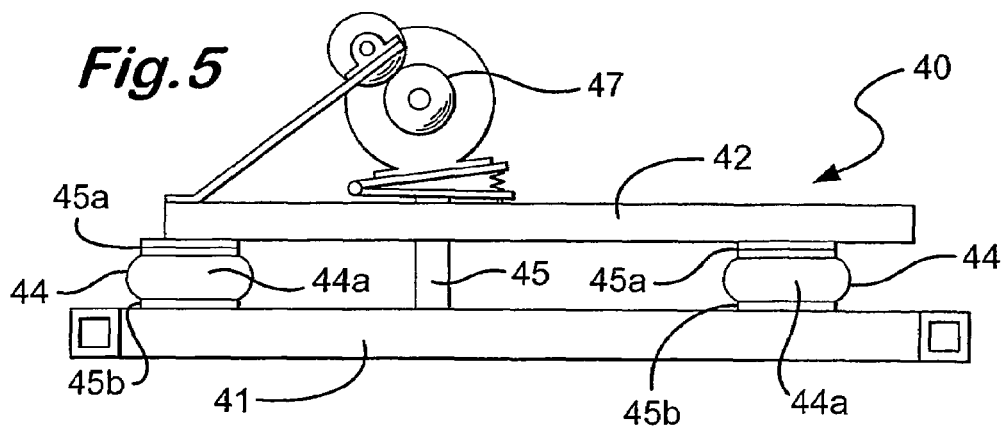
FIG. 5 is a side view of a shale her in accordance with the present invention.

FIG. 5 shows a shale shaker 40 in accordance with the present invention, which has a lower base frame 41 on which is mounted a screen bed support frame 42. Air springs 44 positioned between mount members 45a connected to the support frame 42 and mount members 45b connected to the base frame 41 provide resilient support for the support frame 42. Vibratory apparatus 47 connected to the support frame 42 vibrates the support frame 42 and thus vibrates a screen or screens on the support frame 42. A vertical strut 45 provides support for the vibratory apparatus 47. Each air spring 44 has a body 44a. The support frame 42 has a depth, which may be extended to form a basket around the edges of the screen to inhibit larger particles falling off the sides or end of the screens and to guide the larger particles into a conveyor ditch, skip or hopper for further processing and to guide contain liquid before it passes through the screen.

In accordance with the present invention, the base fame 41, bodies 44a, strut 45, mount members 45a, and/or mount members 45b are, preferably made of composite material or of steel encased in or coated with composite material. A shale shaker similar to the shale shaker 40, but with no teaching, motivation, or suggestion of using such composite material for a shale shaker or parts thereof, is disclosed in U.S. Pat. No. 5,685,982, incorporated fully herein for all purposes.

Figure 6:
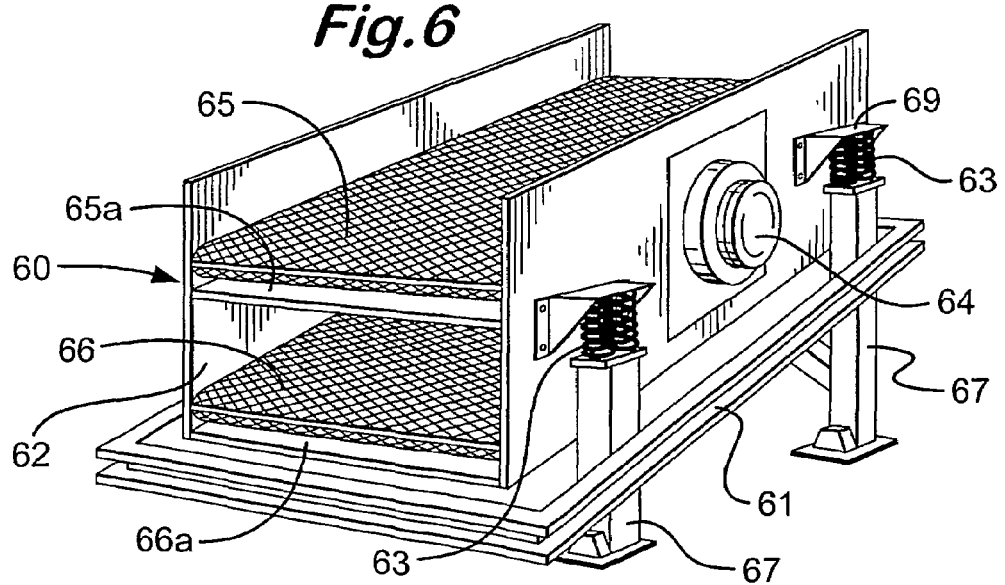
FIG. 6 is a perspective view of a vibratory separator in accordance with the present invention.

FIG. 6 shows a vibratory separator 60 in accordance with the present invention which has a stationary base 61 and a moving frame 62 moved by apparatus 64 connected to the fame 62. Intervening resilient members 63 are positioned between brackets 69 of the frame 2 and posts 67 of the base 61. Screens 65 and 66 are mounted on corresponding decks 65a and 66a, respectively. It is to be understood that although only one side of the separator 60 is shown in FIG. 6, the other side is like the side that is shown (as is true for the apparatus of FIGS. 4 and 5 also).

In accordance with the present invention, the base 61, resilient members 63, brackets 69, posts 67, and/or decks 65a, 66a are made of composite material or steel encased in or coated with composite material. EP-A-0 238 455, App. No. 87930099.5 filed Mar. 17, 1987 discloses a separator similar to the separator 60, but it has no teaching, suggestion or motivation to make a separator or parts thereof of such composite material. This EPO Application is incorporated fully herein for all purposes.

Figure 8:
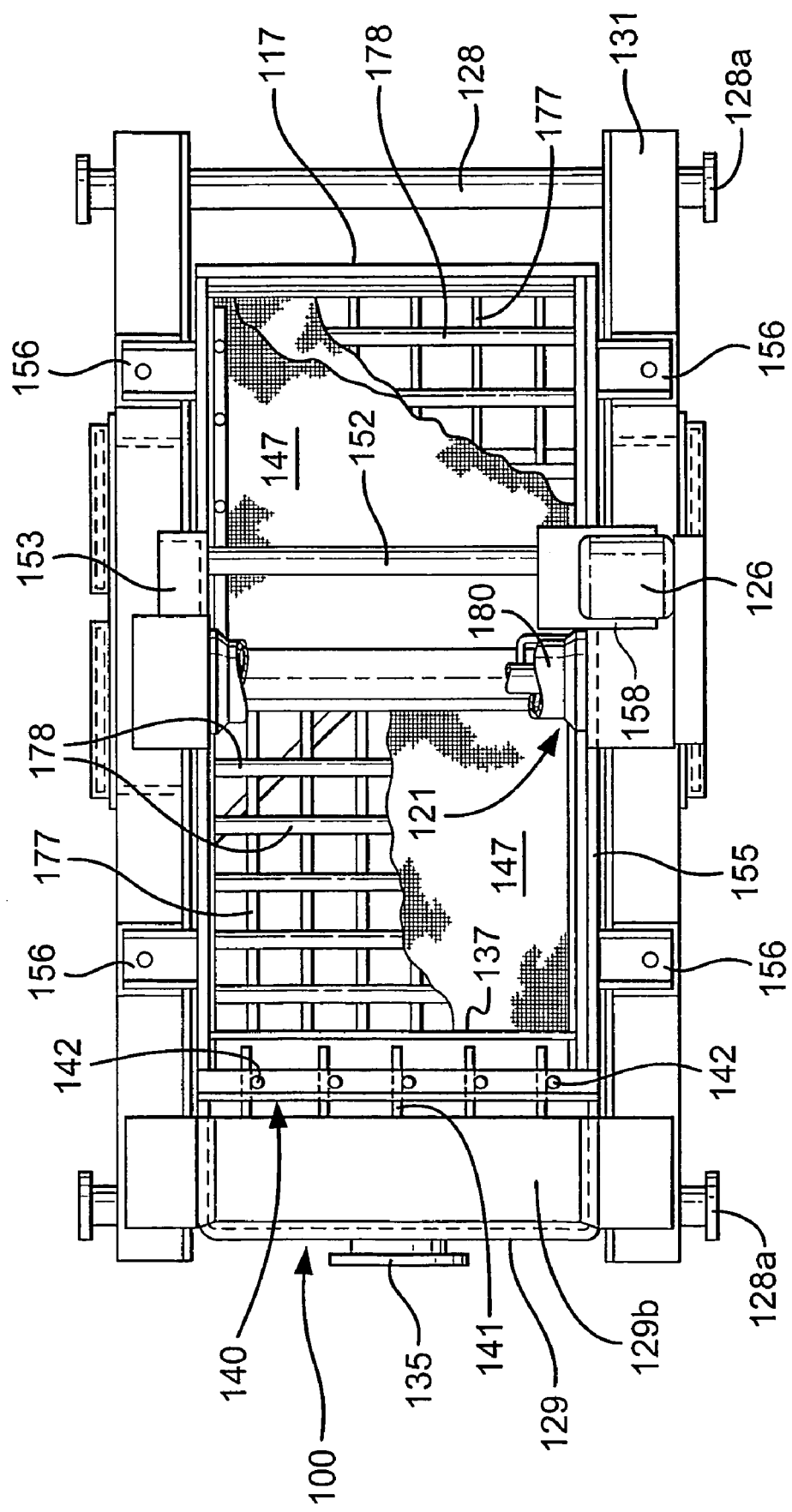
FIG. 8 is a top view or the vibratory separator of FIG. 7.
Figure 9:
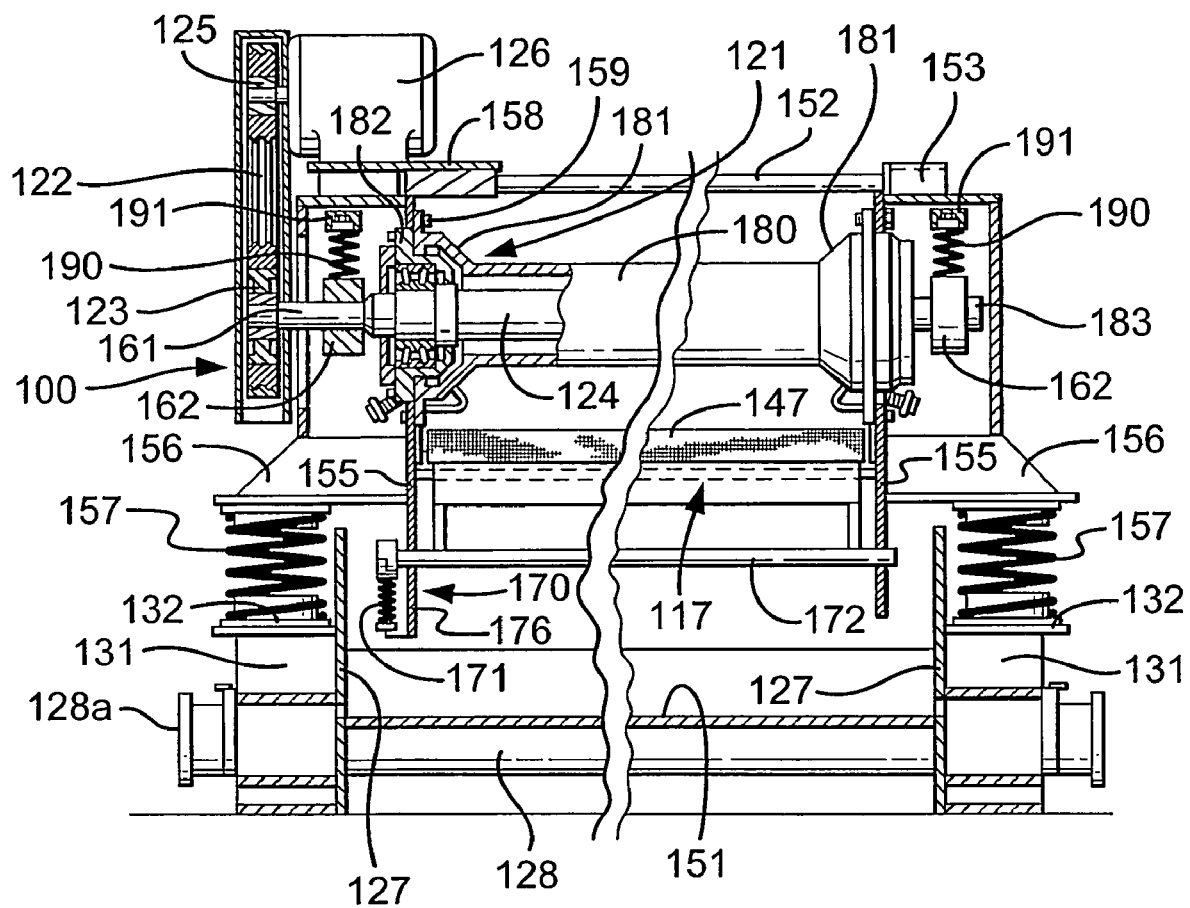
FIG. 9 is a view along line 9-9 of FIG. 7.

FIGS. 7 to 9 show a vibratory separator 100 which is a portable, self-contained unit, having a combined tank and basic 115, screen box 116, screen 147, screen deck 117 and drive 118. Combined tank and base 115 is "L" shaped in its side elevation and the screen is substantially rectangular in its plan view. Screen box 116 is spring supported on base 115 and carries screen deck 117 and vibrator assembly 121. A drive 118 has a V-belt 122 connecting pulley 123 to one end of vibrator shaft 124 and pulley 125 attached to electric motor 126 mounted on the top of box 116. The tank and base 115 have two vertical side plates 127, two transverse tubes 128, feed-box 129 and collecting tank 130. Each side plate 127 may have horizontal stiffeners 131 and two spring support brackets 132. Upper edge 133 of the side plate is sloped downwardly from the feed-end to the discharge to conform generally to the average slope of screen deck 117. Two tubes 128 act as transverse structural ties between side plate 127 at each end of the base near the bottom of the side plates. The tubes extend outwardly beyond the side plates and horizontal stiffeners to permit a hoisting sling to be used over each tube end 128a. At the feed-end of the screen, feed box 129 is attached to side plates 127 just above one of the transverse tubes 128 and has lower portion 129a and upper portion 129b. The lower portion is triangular in transverse cross-section and is arranged to receive material from inlet pipe 135 and direct same upwardly to the generally rectangular portion 129b which communicates with flume 137. Adjustable feed vanes 140 are provided in feed flume 137. Each vane 140 has a pivoted vertical plate 141 attached to threaded rod 142. The plates are, preferably, approximately as wide as the spacing between the threaded rods and as high as sides 143 of flume 137. When set perpendicular to the flow, the vanes can prevent or inhibit flow, but when opened they present a wide surface to control the direction of flow. Collecting tank 130 is integrally formed in base 115 to provide a watertight hopper for collecting undersize material and water flowing through screen 147 supported on screen deck 117. The screen 147 may be any suitable known screen for a shale shaker. In the lower central portion of each side plate 127, discharge openings 148 are provided for withdrawing undersize material. A formed bottom plate 151 sloping from the feed-end to discharge openings 148 and flanged vertically at the discharge end, is connected or welded to side plates 127 to provide for the collection of the undersize material and water and to permit it to flow to discharge openings 148. Screen box 116 has two vertical side plates 155 which are, preferably, approximately trapezoidal in outline. Spring support brackets 156 are on each side plate at predetermined locations. Coil springs 157 are located between screen box brackets 156 and base brackets 132 to provide for isolation of vibrating screen box 116 from base 115. Screen deck 117 is connected to or bolted to side plates 155 to tie them together transversely into a rigid structure. Motor support plate 158 is fastened to the top of one side plate 155 slightly forwardly of its longitudinal center line. Horizontal transverse tube 152 connects motor support plate 158 to counter weight 153 mounted on the opposite plate. Springs 190 are disposed between weight assemblies 162 and mounts 191. Counterweight 153 balances the weight of the drive on the screen box to obtain more uniform motion. The vibrator assembly 121 is connected to each side plate 155 for example, with fasteners 159. Drive extension 161 of vibrator shaft 124 extends beyond counterweight assembly 162 on the same side of the screen box as the motor support plate 158. Screen box 116 with screen deck 117, drive 118, vibrator assembly 121 and screen means 147 all move as a unit with a vibration motion produced by vibrator 121. Screen deck 117 has a generally horizontal feed section 119 followed by inclined discharge section 120, for example, inclined downwardly at 5 degrees in the direction of flow. Vibrator assembly 121 has a tubular housing 180, with flanged end bell section 181 on each of its ends, which is connected to screen box side plates 155. Within each end bell 181 there is a flanged cartridge type sealed spherical roller bearing block 182. The bearing blocks support vibrator shaft 124 which has a concentric extension 183 on each of its ends beyond the bearing box for mounting counterweight assemblies 162. End 161 of the vibrator shaft is further extended to carry V belt pulley 123 for drive 118.

Tensioning arrangement 170 includes support rod 172 extending between side plates 155 of screen box 116. A longitudinally extending member is pivotally attached to rod 172. A spring 171 is connected at one end to a end of the longitudinally extending member and at its other end to bracket 176 which in turn is connected to the bottom of side plate 155. A tension member extends vertically upward from shaft 172. A spring member 171 provides a force for urging the tensioning member in a clockwise direction.

The screen 147 is supported in a longitudinal direction via transversely extending bars 177 having generally "U" shaped support members 178 attached at the top thereof to directly support the undersurface of screen 147. The support members are made from or covered with rubber or composite or metal (for example steel, stainless steel, aluminum, aluminum alloy, zinc, zinc alloy, bronze, brass or iron) encased in or coated with composite material or other suitable material. The support bars 177 located at the feed end of screen deck 117 progressively decrease in height to provide a bowed or cambered support surface for screen 147. The support bars 177 disposed under screen 147 of discharge section 120 progressively decrease in height relative to the 5 degree downward incline in the direction of flow to also provide a bowed or cambered support surface for overlying screen 147. The bowed or cambered support surface provided by members 177 and 178 enable screen 147 to be tensioned evenly when placed on deck 117.

The various parts and components of the separator 100 may, in accordance with the present invention, be made of composite material, steel or other suitable meal or coated with or encased in composite material; including, but not limited to parts bearing numerals: 115-116, 119, 120, 124, 127-133, 135, 137, 140-143, 148, 151-153, 155-159, 161, 162, 171, 172, 176-178, 180-183, 190, and/or 191.

U.S. Pat. No. 4,420,391 (fully incorporated herein for all purpose) discloses a separator similar to the separator 100, but it has no teaching, suggestion, or motivation to use composite material as disclosed in accordance with the present invention for separators or parts thereof.

Figure 10:
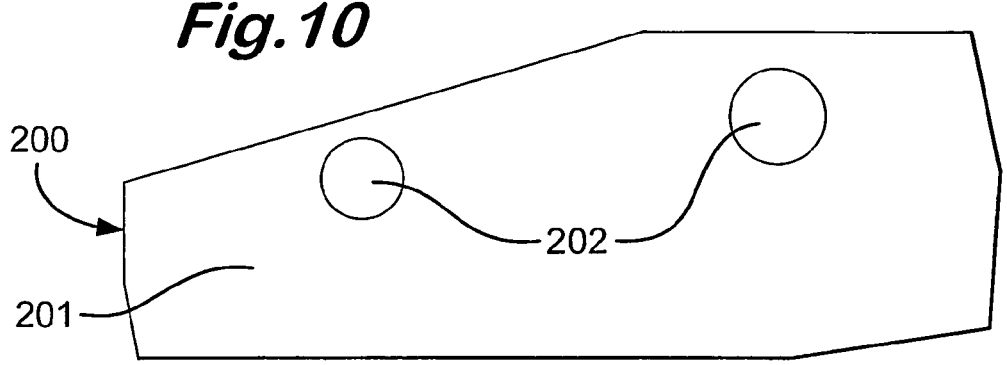
FIG. 10 is a plan view of a side in accordance with the present invention for a vibratory separator or shale shaker.

FIG. 10 shows a side wall 200 for a shale shaker basket which has a main body 201 made of any suitable materials including, but not limited to metal, steel, fiberglass, or composite material. Portions 202 of the body 201 are made of composite material and provide attachment points for brackets or other mount members for mounting the basket to springs, air springs, resilient members, or shock absorbers. Any suitable composite may be used, including, but not limited to, relatively flexible composite material as disclosed in or as referred to in references cited in U.S. Pat. No. 6,346,319.

Figure 11:
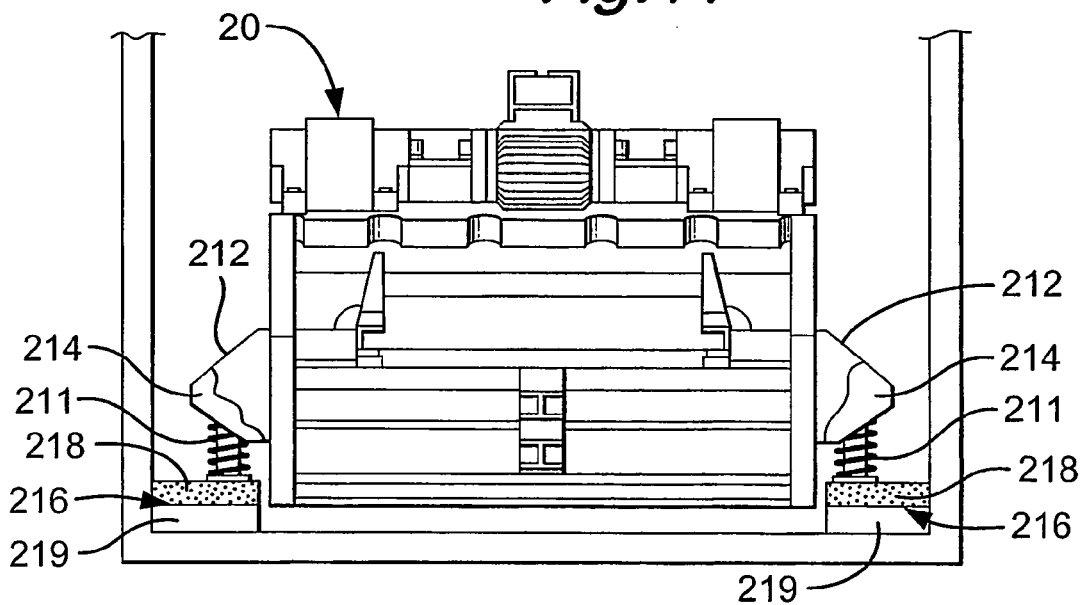
FIG. 11 is an end view of a shale shaker in accordance with the present invention.

FIG. 11 shows a shale shaker 210 like the shale shaker of FIG. 3, but with basket spring mounts 212 which have a portion 214 made of relatively flexible composite material. Optionally, base members 216 to which springs 211 are secured have a top portion 218 made of such relatively flexible composite material and a lower section 219 made of less flexible composite material or of metal, for example, but not limited to, steel. Any part disclosed herein may have a portion made of such relatively flexible composite material.

Figure 12:
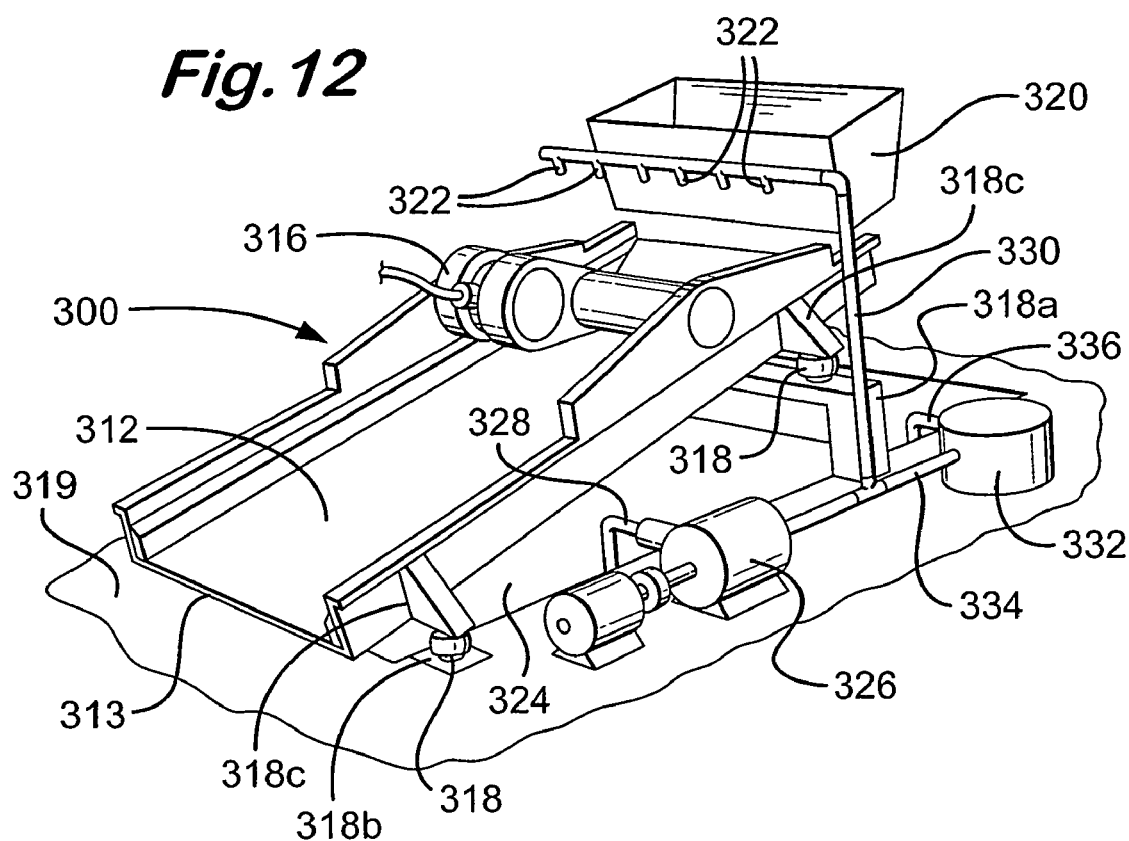
FIG. 12 is a perspective view of a shale shaker in accordance with the present invention.

FIG. 12 shows a shale shaker 300 in accordance with the present invention which has a vibrating screen 312 with a lower edge 313, vibrated by vibrator 316 with nozzles 322 for spraying cuttings with washing fluid. A pump 326 pumps the fluid from a tank 324 through a line 328 and recirculates the fluid through a line 330. Material is fed onto the screen 312 from a chute 320. A portion of the pump output can be diverted via a line 334 to a hydrocyclone or centrifuge 332 and then through a line 336 to the tank 324. The screen 312 is secured to a support structure or base 319 by hollow elastomeric isolators 318 which may be of the pneumatically expandable type to tune the apparatus to achieve a desired vibratory pattern or, instead of the isolators 318, coil springs, solid shock absorbers, or resilient members may be used. The isolators 318 are mounted between isolator mounts 318c and 318a or 318b. It is to be understood that although only one side of the shaker is shown in FIG. 12, the other side is like the side that is shown (as is true for other apparatus shown in figures herein).

In accordance with the present invention, the base 319, isolators 318, isolator mounts 318c, isolator mounts 318a and 318b, and/or the chute 320 are made of composite, material or metal encased in or coated with composite material. GB-A-2,089,403 and U.S. Pat. No. 3,014,587 disclose a shaker similar to the shaker 300, but they have no teaching, suggestion or motivation to make a shaker or parts thereof of composite material as disclosed in accordance with the present invention. This U.K. Application and U.S. patent are incorporated fully herein for all purposes.

Figure 13A:
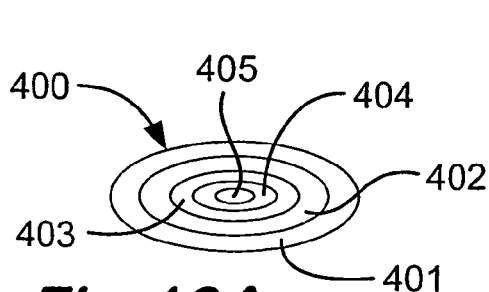
FIG. 13A is a top view of a structural member for a shale shaker in accordance with the present invention.
Figure 13B:
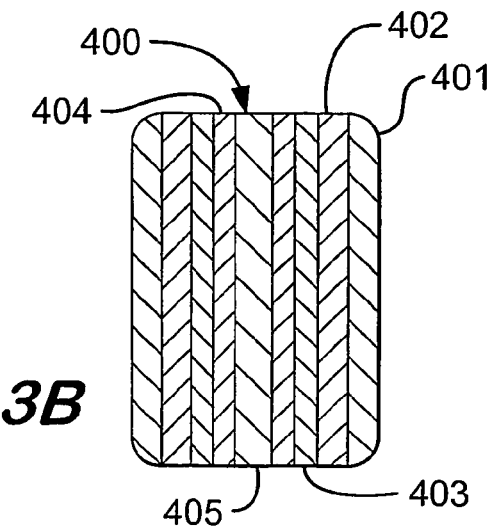
FIG. 13B is a side cross-section view of the member of FIG. 13A.

FIGS. 13A and 13B disclose a structural member 400 in accordance with the present invention for use with vibratory separators and shale shakers. Although shown with a generally elliptical tar cross-section, any suitable cross-section may be used. In one particular aspect the member 400 is used for mounting springs or other isolators between a screen support and a base or housing; but it is to be understood that, in accordance with the present invention, such structure may be used for basket ends or walls, chutes, posts, and for supporting members or bases. As shown the member 400 has a plurality of rings of different material. In one aspect rings 401 and 403 and a core 405 are made from relatively rigid composite material and the rings 402, 404 are made from flexible composite material. Alternatively, the rings 402, 404 are made of the rigid material and the rings 401, 403 and core 405 are made of the flexible material. It is within the scope of the present invention to use any desired number of rings of either material.

Figure 14:
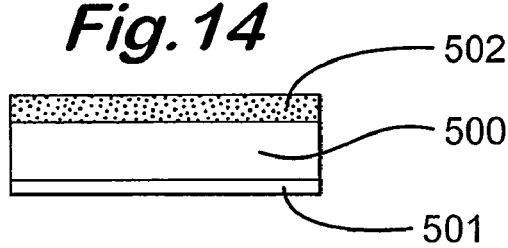
FIGS. 14 to 16 are side cross-section views of parts of shale shakers in accordance with the present invention.

FIG. 14 shows a wall or end 500 of a basket of a separator or shaker in accordance with the present invention. The wall or end 500 has a coating of composite material 501 on one side and a layer of composite material 502 on the other side. Alternatively both sides are coated or both sides have a layer of the material. Any composite material disclosed herein may be used. In certain aspects the coating 501 is the thickness of one, two, three, four more layers of paint and the layer 502 ranges between 1/64th inch and 1/2 inch in thickness.

Figure 15:
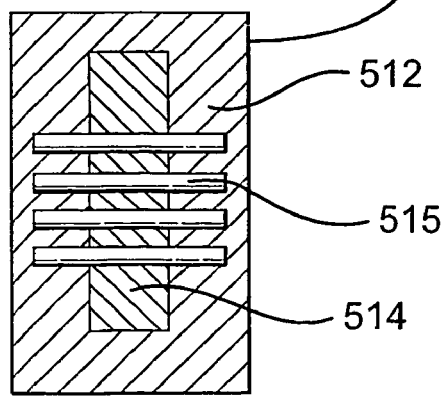

FIG. 15 shows a spring mount or spring support 510 which has a body 512 made of composite material and inner core 514 made of composite material. A plurality of spaced-apart rods or discs 515 extend through the core 514 and have ends that project into the body 512. Such a structure may be used for basket side walls and ends, for bases or supports, and for posts or chutes. In certain aspects the body 512 is made of relatively rigid composite material and the core 514 and discs or rods 515 are made of relatively flexible composite material, or vice-versa. The body 512 and the core 514 may have a top cross-section like that of the member 400 in FIGS. 13A and 13B; or they may have any desired cross-sectional shape, including, but not limited to, triangular, square, rectangular, pentagonal or hexagonal. Any member, base, mount or structural part disclosed herein in accordance with the present invention may have the rods or discs or core of the support 510 and/or a ring or rings or core as in the member 400.

Figure 16:
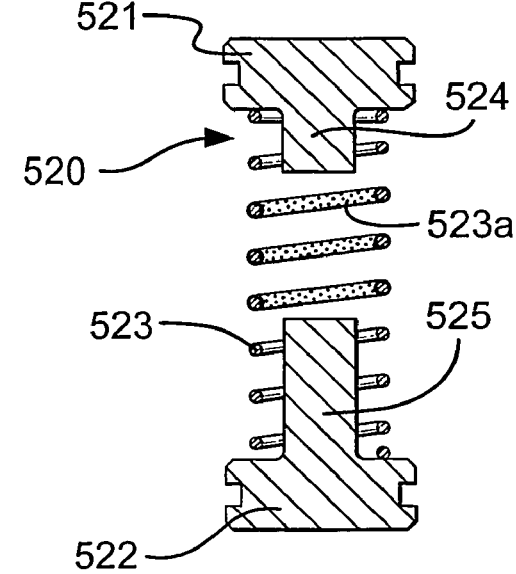

FIG. 16 shows a spring mounting apparatus for a sprig or other isolator of a separator or shaker that has a lower mount member 522 and an upper mount member 521. These mount member may be suitably attached or secured to a part of a separator or shaker and to a base or housing. Extending between the mount members 521, 522 is a wring 523. A lower part of the spring 523 encircles a projection 525 of the lower mount member 522 and an upper part of the spring 523 encircles a projection 524 of the upper mount member 521. The top cross-sections of the mount members 521, 522 and of the projections 524, 525 may be like a top cross-section like that of the member 400 in FIGS. 13A and 13B; or they may have any desired cross-sectional shape, including, but not limited to, triangular, square, rectangular, pentagonal or hexagonal. The mount members 521 and 522 are made of composite material. The spring 523 has a portion thereof coated with composite material 523a; but it is within the scope of this invention for any other part or parts of the spring 523, or substantially all of it, to be so coated.

"Composite" material as used herein includes fiberglass material and other non-metallic composite materials of sufficient strength and rigidity to serve as the listed parts, in accordance with the present invention, of shale shakers, including, but not limited to, the composite materials referred to in U.S. Pat. Nos. 6,335,101; 6,346,425; 6,352,779; 6,343,038; 6,355,206; 6,355,358; 6,361,860; 6,324,833; 6,324,833; and 6,358,603 and in the references cited in these patents—all fully incorporated here for all purposes. It is within the scope of the present invention to use for a part for a shale shaker (arts listed or mentioned above in accordance with the present invention) a composite material with reinforcing wires, bars, cables, pieces, plates, rods and/or discs which are metal, wood or plastic and with and/or within a matrix of cement, fiberglass, and/or plastic, including, but not limited to, as disclosed in U.S. Pat. No. 6,358,603 and in the references referred to in this patent, all of which are incorporated fully herein for all purposes. This discloses Compact Reinforced Composite (CRC) and in general to impact-resistant articles which are based on a combination of a hard, but fracture-ductile matrix and a three-dimensional reinforcement which is internally tension interlocked in at least one dimension. This produces articles unique in showing high strength, rigidity and ductility in all three directions and showing, upon being subjected to a large load, high strength, toughness and rigidity, as well as the capability of absorbing high energy with retention of a substantial degree of internal coherence, also under exposure to high-velocity or high energy impact. The articles, at least one domain of which has a three-dimensionally reinforced composite structure, the composite structure comprising a matrix and a reinforcing system, the reinforcing system comprising a plurality of bodies embedded in the matrix and extending three-dimensionally in first, second and third dimensions therein, the reinforcing system being tension interlocked in at least one dimension in the reinforcement components extending in the first and/or second dimension are tension interlocked to reinforcement components extending in the same dimension(s), but at a transverse distance therefrom, by transverse reinforcement components extending in a dimension transverse to a plane or surface defined by the reinforcement in the first and/or second dimension the matrix having a compressive strength of at least 80 MPa, a modulus of elasticity of at least 40 GPa, and a fracture energy of at least 0.5 kN/m, the reinforcing bodies having a tensile strength of at least 200 MPa, preferably at least 400 Mpa.

The invention claimed is:

1. A shale shaker comprising a base, vibration isolation apparatus connected to said base, a basket connected to said vibration isolation apparatus, vibrator apparatus connected to the basket to vibrate said basket, at least one of said base, said basket and said vibration isolation apparatus including a first portion made of flexible composite material and a second portion made of rigid composite material, the vibration isolation apparatus including
basket spring mounts connected to the basket,
base mount members connected to the base,
a spring on each base mount member positioned below a basket spring mount,
the first portion made of flexible composite material comprising a portion of the base mount members and the second portion made of rigid composite material comprising a portion of the base mount members,
the vibration isolation apparatus including a spring mount base with a core and a portion surrounding the core,
the core made of flexible composite material,
a first ring around the core, the ring made of rigid material,
the first portion made of flexible composite material comprising a second ring around the first ring.

2. The shale shaker of claim 1 wherein
each basket spring mount includes a spring support,
each spring is on a spring support,
each spring support including a body and a core in the body,
the core comprising the first portion made of flexible composite material.

3. The shale shaker of claim 2 further comprising
a plurality of spaced-apart rods extending through the core and into the body.

4. A shale shaker as claimed in claim 1 wherein the first portion of flexible composite material includes at least one reinforcing part within the composite material.

5. A shale shaker as claimed in claim 4 wherein the reinforcing part is made of metal.

6. A shale shaker as claimed in claim 4 wherein the reinforcing part is made of material from the group consisting of wood, plastic, fibre, and composite material.

7. A shale shaker as claimed in claim 1 further comprising electronic tracking apparatus on the shale shaker.

8. The shale shaker of claim 1 wherein the base mount members have a top part and the top part includes the first portion made of flexible composite material and the second portion made of rigid composite material.

9. The shale shaker of claim 8 wherein
the base mount members include a bottom part beneath the top part, the bottom part made of metal.

10. The shale shaker of claim 1 wherein the basket spring mounts have a part comprising the first portion made of flexible composite material.

11. The shale shaker of claim 1 wherein
the first portion made of flexible composite material is adjacent the second portion made of rigid composite material.

12. The shale shaker of claim 3 wherein the rods are made of flexible composite material.

13. The shale shaker of claim 1 wherein
the basket has a wall,
the wall comprises a main part with a first side spaced-apart from a second side,
the first side having a layer of flexible composite material thereon.

14. The shale shaker of claim 13 wherein
the second side has a coating of composite material thereon.

15. The shale shaker of claim 13 wherein the layer of flexible composite material ranges between 1/64 inch and 1/2 inch in thickness.

16. A shale shaker as claimed in claim 1 wherein
the shale shaker has a screen support apparatus,
the vibratory apparatus for vibrating the screen support apparatus,
isolation apparatus for isolating the screen support apparatus to inhibit vibrations vibrating the screen apparatus from vibrating objects other than the screen support apparatus and the screen apparatus,
mounting apparatus to which is mounted the vibration isolation apparatus, the mounting apparatus made from composite material, and
the mounting apparatus includes at least one mount portion made from flexible composite material and at least one mount portion made from rigid composite material.

17. A shale shaker as claimed in claim 16 wherein the at least a portion made from flexible composite material is a plurality of spaced-apart amounts of flexible composite material.

18. A shale shaker as claimed in claim 16 wherein the vibration isolation apparatus includes a plurality of spaced-apart isolaters.

19. A shale shaker as claimed in claim 16 wherein the vibration isolation apparatus is from the group consisting of springs, resilient members, cushions, flexible hollow members, and inflatable members.

20. A shale shaker as claim in claim 1 wherein the shale shaker is for treating fluid introduced thereto, the fluid to be treated comprising fluid with drilled cuttings therein.

21. A shale shaker as claimed in claim 1 wherein the shale shaker is for treating fluid introduced thereto, the fluid to be treated including lost circulation material.

22. A shale shaker as claimed in claim 21 wherein the lost circulation material includes fibrous lost circulation material.

23. A method for treating fluid with a shale shaker, the method comprising providing a shale shaker comprising a base, vibration isolation apparatus connected to said base, a basket connected to said vibration isolation apparatus, vibrator apparatus connected to the basket to vibrate said basket, at least one of said base, said basket and said vibration isolation apparatus including a first portion made of flexible composite material and a second portion made of rigid composite material,
the vibration isolation apparatus including
basket spring mounts connected to the basket,
base mount members connected to the base,
a spring on each base mount member positioned below a basket spring mount,
the first portion made of flexible composite material comprising a portion of the base mount members and
the second portion made of rigid composite material comprising a portion of the base mount members,
the vibration isolation apparatus including a spring mount base with a core and a portion surrounding the core,
the core made of flexible composite material,
a first ring around the core, the ring made of rigid material,
the first portion made of flexible composite material comprising a second around the first ring,
introducing fluid to be treated to the shale shaker,
processing fluid through the shale shaker.

24. A method as claimed in claim 23 wherein said fluid includes drilled cuttings.

25. A method as claimed in claim 23 wherein said fluid includes lost circulation material.

* * * * *